US008885263B2

(12) United States Patent
Theriault

(10) Patent No.: US 8,885,263 B2
(45) Date of Patent: Nov. 11, 2014

(54) OPTICAL ZOOM LENS SYSTEM

(71) Applicant: Raytheon Company, Waltham, MA (US)

(72) Inventor: Philip Christopher Theriault, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 37 days.

(21) Appl. No.: 13/830,724

(22) Filed: Mar. 14, 2013

(65) Prior Publication Data

US 2013/0314801 A1 Nov. 28, 2013

Related U.S. Application Data

(60) Provisional application No. 61/650,626, filed on May 23, 2012.

(51) Int. Cl.
- *G02B 3/12* (2006.01)
- *G02B 15/177* (2006.01)
- *G02B 3/14* (2006.01)
- *G02B 15/14* (2006.01)
- *G02B 15/173* (2006.01)

(52) U.S. Cl.
CPC .............. *G02B 15/14* (2013.01); *G02B 15/177* (2013.01); *G02B 3/14* (2013.01); *G02B 15/173* (2013.01)
USPC ......................................... 359/676

(58) Field of Classification Search
CPC ....................................................... G02B 3/14
USPC .................................................. 359/666, 676
See application file for complete search history.

(56) References Cited

U.S. PATENT DOCUMENTS

| | | | |
|---|---|---|---|
| 6,091,551 A | 7/2000 | Watanabe | |
| 6,424,460 B1 | 7/2002 | Kirkham | |
| 2008/0304167 A1 | 12/2008 | Souma | |
| 2009/0079824 A1 | 3/2009 | Winsor | |
| 2010/0231783 A1* | 9/2010 | Bueler et al. | 348/347 |
| 2012/0057223 A1 | 3/2012 | Cook | |

* cited by examiner

*Primary Examiner* — Joseph P Martinez
(74) *Attorney, Agent, or Firm* — Lando & Anastasi, LLP

(57) ABSTRACT

According to various aspects, an optical zoom lens system and a method magnifying an image using an optical zoom lens system are disclosed. In one example, the optical zoom lens system comprises a first lens group including a first focus-tunable lens and a first negative lens, a second lens group, positioned after the first lens group in an optical path, a third lens group, positioned after the second lens group in the optical path, and a fourth lens group, positioned after the third lens group in the optical path, including a second focus-tunable lens and a second negative lens.

18 Claims, 5 Drawing Sheets

OPTICAL ZOOM LENS SYSTEM

CROSS-REFERENCE TO RELATED APPLICATIONS

This application claims priority under 35 U.S.C. §119(e) to U.S. Provisional Patent Application No. 61/650,626 titled "OPTICAL ZOOM LENS SYSTEM" filed on May 23, 2012, which is incorporated herein by reference in its entirety.

BACKGROUND

Imaging systems include zoom lenses that provide various magnification of the target image. Generally zoom lenses consist of a number of individual lenses that may be either fixed or variable. The variable lenses slide on a linear bearing along an axis using motorized mechanisms to change the magnification on the zoom lens. This movement is usually performed by an arrangement of gears and cams in the zoom lens housing. Some zoom lenses use computer-controlled servos to perform lens positioning.

SUMMARY

The motorized mechanisms, as described above, are not usable in harsh environments such as industrial, space and aero, and combat conditions, where higher durability is desired. In addition, conventional zoom lenses are bulky and are not well suited for applications where a small form factor is preferred. Accordingly, aspects and embodiments are directed to a zoom lens that uses one or more focus-tunable lenses. This zoom lens design includes no sliding parts, bearings or motors. In addition, embodiments of the zoom lens described herein operate more efficiently than a conventional zoom lens by using less power and may extend battery life of a battery-powered imaging system.

According to one aspect, an optical zoom lens system is disclosed. The optical zoom lens system comprises a first lens group including a first focus-tunable lens and a first negative lens, a second lens group, positioned after the first lens group in an optical path, a third lens group, positioned after the second lens group in the optical path, and a fourth lens group, positioned after the third lens group in the optical path including a second focus-tunable lens and a second negative lens. In one example, the second lens group further includes a first negative meniscus lens and a first positive meniscus lens. In another example, the second lens group further includes a first positive lens and a second positive lens.

In one example, the first focus-tunable lens and the second focus-tunable lens each include a curvature which changes in response to an applied control signal. According to at least one example, the first tunable lens and the second focus-tunable lens are plano-convex lenses. In addition, the first tunable lens and the second focus-tunable lens each may has a variable focal length that changes in response to an applied control signal. The variable focal length may be between approximately 10 millimeters and 165 millimeters.

In another example, the system comprises an aperture stop disposed between the third lens group and the fourth lens group. In addition, the first positive lens may include a bi-convex lens. The second positive lens may include a plano-convex lens and the second positive lens may include a bi-convex lens.

According to other examples, the optical system has a field of view that changes based on changes to at least one of the curvature of the first focus-tunable lens and the second focus-tunable lens. In at least one example, the field of view is configured to change from plus or minus approximately 3 degrees to approximately 35 degrees. In another example, the optical system has a focal length that changes based on changes to at least one of the curvature of the first tunable lens and the second focus-tunable lens. In this example, the focal length is configured to change from approximately 8 mm to 57 mm.

According to another aspect, a method of magnifying an image using an optical zoom lens system is disclosed. The method comprises reflecting, using a first lens group comprising a first focus-tunable lens, light rays incident thereon from the image, reflecting, using a second lens group, the light rays received from the first lens group, reflecting, using a third lens group, the light rays received from the second lens group, and reflecting, using the fourth lens group comprising a second focus-tunable lens, the light rays received from the third lens group toward an image sensor.

According to some examples, the method further comprises applying a control signal to at least one of the first focus-tunable lens and the second focus-tunable lens results changing a curvature of at least one of the first focus-tunable lens and the second focus-tunable lens. In other examples, the method further comprises applying a control signal to at least one of the first focus-tunable lens and the second focus-tunable lens result in a change to a field of view the optical zoom lens system.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures.

DETAILED DESCRIPTION

Figure 1:
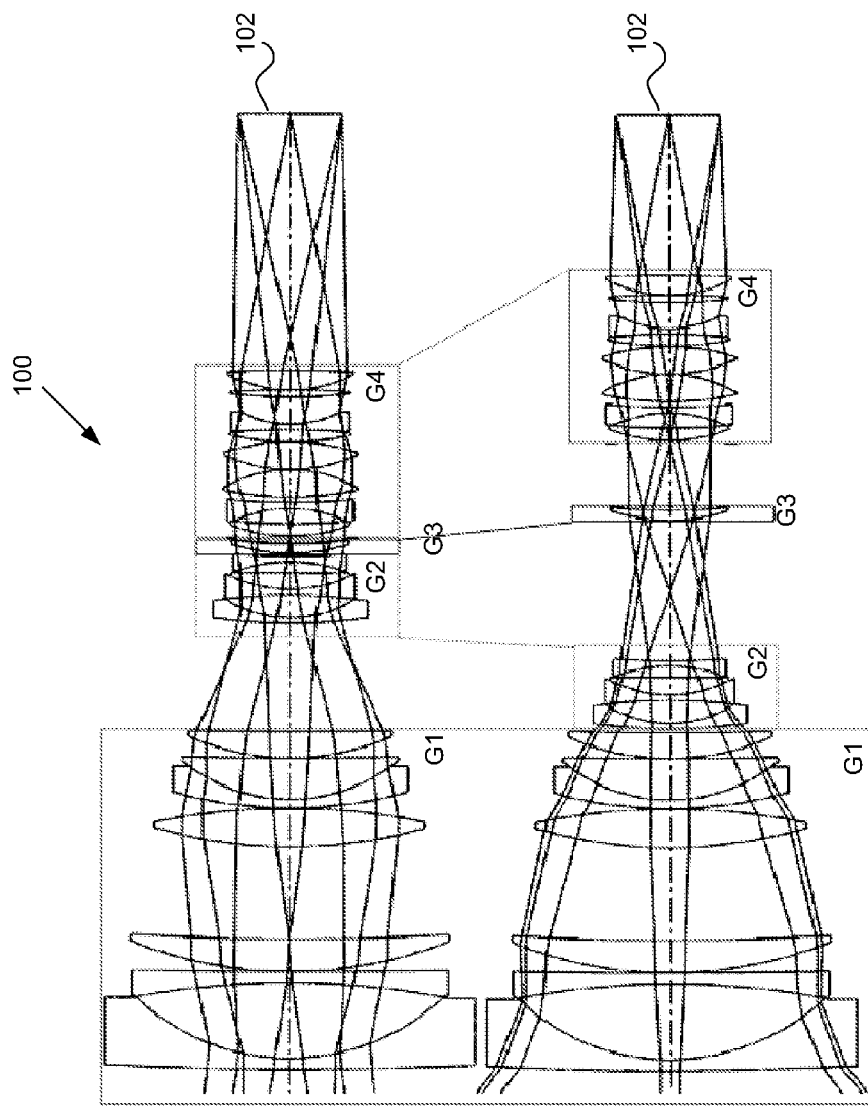
FIG. 1 is an exemplary illustration of a ray-trace section of a conventional optical zoom lens system, in accordance with aspects of the invention.

One example of a conventional zoom lens 100 is shown in FIG. 1. Some conventional zoom lenses generally include a stationary optical lens group G1 and three moving optical lens groups, G2, G3 and G4, with each optical lens group including one or more lens elements. The different optical lens groups serve different functions, including focusing, varying magnification power, maintaining focus and relaying the magnified image from the other groups to the image sensor 102 of the imaging system. As described above, conventional zoom lenses include motorized mechanisms that are configured to move lens groups G2, G3 and G4 along an axis to change a focal length of the zoom lens 100, thereby changing a field of view of the zoom lens 100. A ratio of the longest to the shortest focal lengths typically describes the zoom amount of the zoom lens 100. For example, a zoom lens with a 4:1 focal length ratio is described as having 4× zoom. As shown in FIG. 1, lens groups G2, G3 and G4 move from first position (top) to second position (bottom). Such motorized mechanisms may not be usable in harsh environments such as industrial, aero and space, and combat conditions, where temperature, air pressure (vacuum), dust, moisture, shock and vibration may impact operation of the mechanisms.

Accordingly, there is a need for zoom lens system that does not include movable parts and can provide zoom lens performance comparable to conventional zoom lens systems. Aspects and embodiments are directed to an optical zoom lens system comprising one or more focus-tunable lenses that change shape responsive to an electrical signal, thereby modifying the focal length of the lens. The focus-tunable lens is disposed in a zoom lens system including groups of lens elements. Unlike conventional zoom lens systems, the groups of lenses are fixed in position and only the curvature of focus-tunable lenses is changed. Because the zoom lens system does not include motorized mechanisms, the zoom lens system is able to withstand harsh environmental conditions. In addition, as a result of not having lenses move along the axis, the overall zoom system has a smaller overall axial length.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
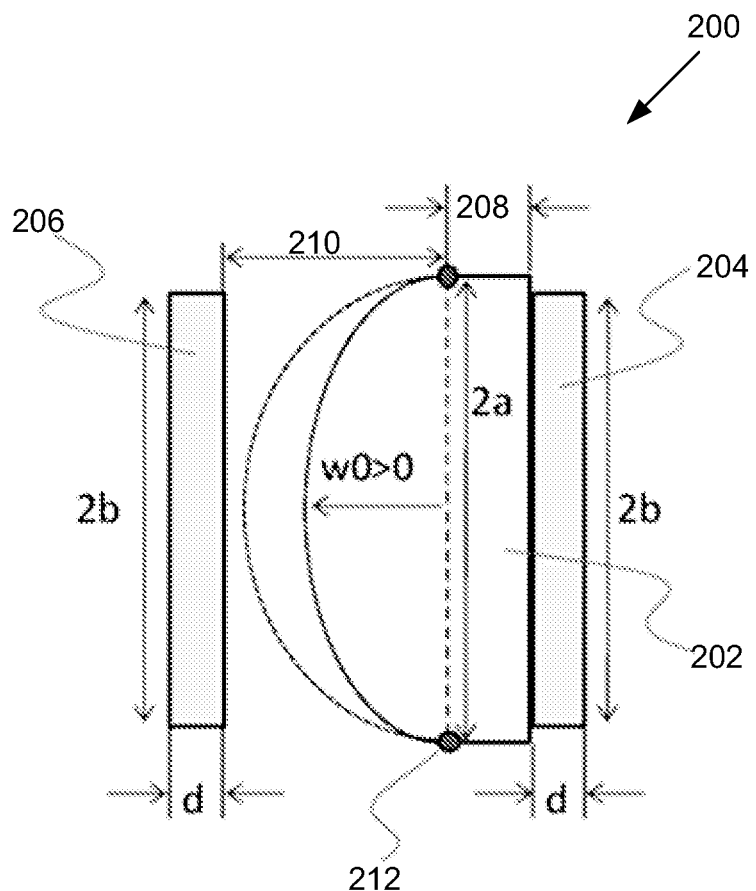
FIG. 2 is an exemplary illustration of a focus-tunable lens 200, in accordance with aspects of the invention.

Referring to FIG. 2, there is illustrated an example of a focus-tunable lens 200 used in embodiments described herein. The focus-tunable lens may be made of an electroactive polymer material that expands as a result of applying an electric control voltage. In one example, the control voltage is the range of approximately 0 to 5 volts. The focus-tunable lens 200 may include a control element that may receive the control voltage and apply either a voltage or a current to the electroactive polymer material. The expansion and contraction of the focus-tunable lens results in changing the curvature of the lens. When fully expanded, the focus-tunable lens may form a plano-convex shape as illustrated. One example of a focus-tunable lens is the Electrical lens EL-10-30 produced by OPTOTUNE AG. The control voltage may be applied by a controller, included in the imaging system, which may determine the curvature of the lens needed to obtain a desired configuration of the optical zoom lens system.

In one example, the focus-tunable lens may include multiple optical elements including an adaptable lens element 202 having a height (2a), and one or more cover glass elements 204 and 206. The adaptable lens element 202 may include a fixed portion 208 having a thickness and an adaptable portion 210 having a central deflection distance (w0). In one example, the central deflection distance is in the range of 20 mm to 150 mm and may be measured from a fixation point 212 positioned between the fixed portion 208 and the adaptable portion 210. The cover glass elements 204 and 206 may be positioned in front and behind the adaptable lens element 202 and may have a height (2b) and a thickness (d). The cover glass may be a borosilicate Schott glass BK7. The fixed portion 208 stays in the same axial position as the control voltage is applied, while the adaptable portion 210 expands towards the cover glass element 206. In one example, the focus-tunable lens 200 may be disposed in an external housing. In one example, a coating may be applied to the cover glass elements 204 and 206. Examples of the coating may include a visible anti-reflection coating, near infrared anti-reflection coating, as well as other coating types.

Further characteristics of the focus-tunable lens are described in the Datasheet for EL-10-30-Series Fast Electrically Tunable Lens, updated Sep. 14, 2011. For example, the focus-tunable lens has the focal tuning range of approximately +10 mm to +165 mm (measured at 525 nm). However, the focus-tunable lens may have different focal tuning ranges. The focus-tunable lens may have various dispersion characteristics. For example refractive index of $n_F$ may be in the range of approximately 1.30 to 1.6 (measured at 486.1 nm), refractive index of $n_D$ may be in the range of approximately 1.3 to 1.6 (measured at approximately 589.3 nm), and refractive index of $n_C$ may be in the range of approximately 1.2 to 1.6 (measured at approximately 656.3 nm). The Abbe number C may be in the range of 28 to approximately 110. Other focus-tunable lens characteristics may include the size of lens aperture (for example 9 to 11 mm), as well as physical dimensions such as thickness (approximately 9 to 11 mm) and external diameter (approximately 29 to 31 mm). However, it is appreciated that other characteristics and dimensions may be selected based on the desired configuration of the optical zoom lens system.

Figure 3A:
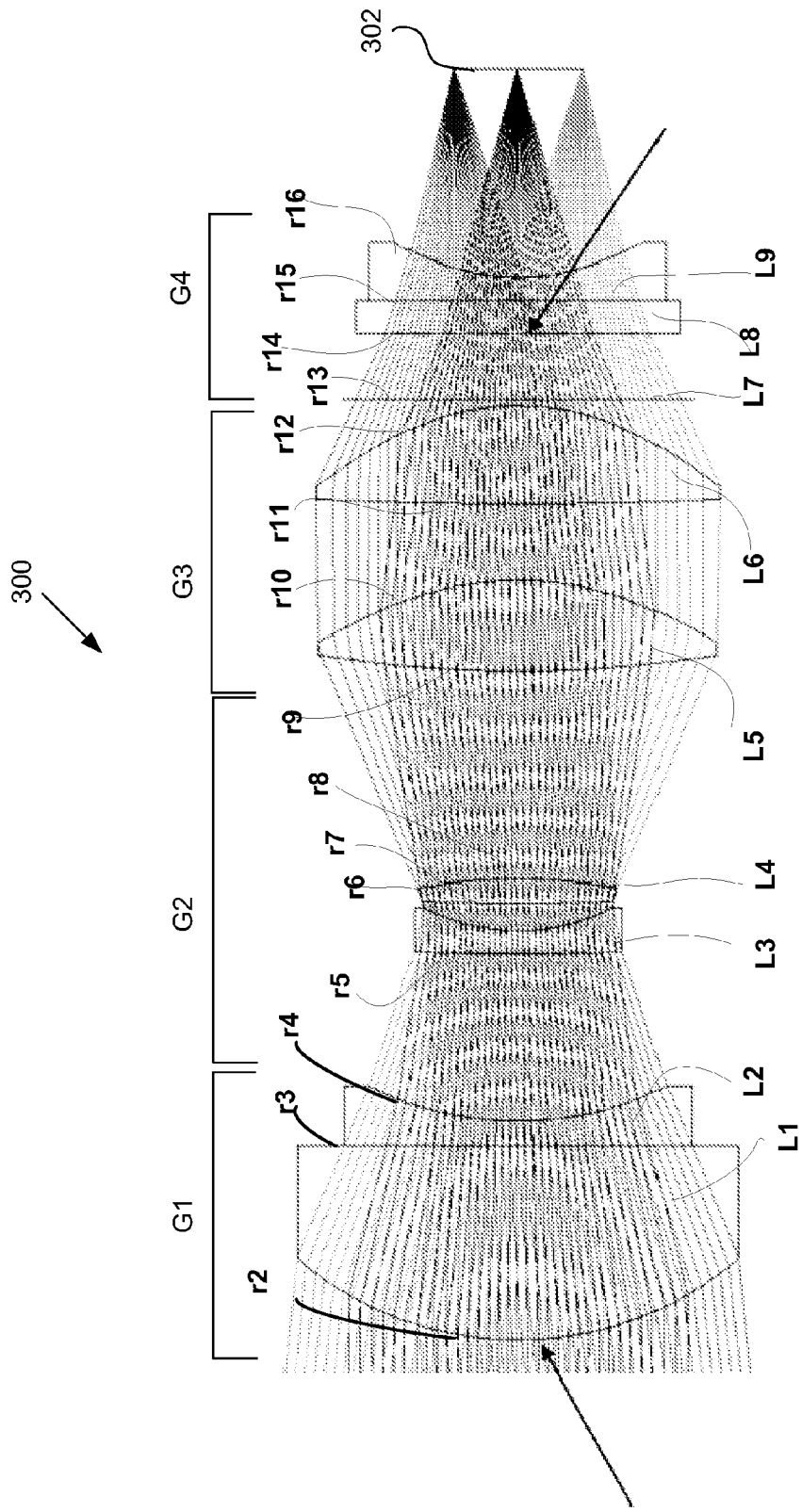
FIG. 3A is an exemplary illustration of a ray-trace section of an optical zoom lens system 300 fully extended, in accordance with aspects of the invention.
Figure 3B:
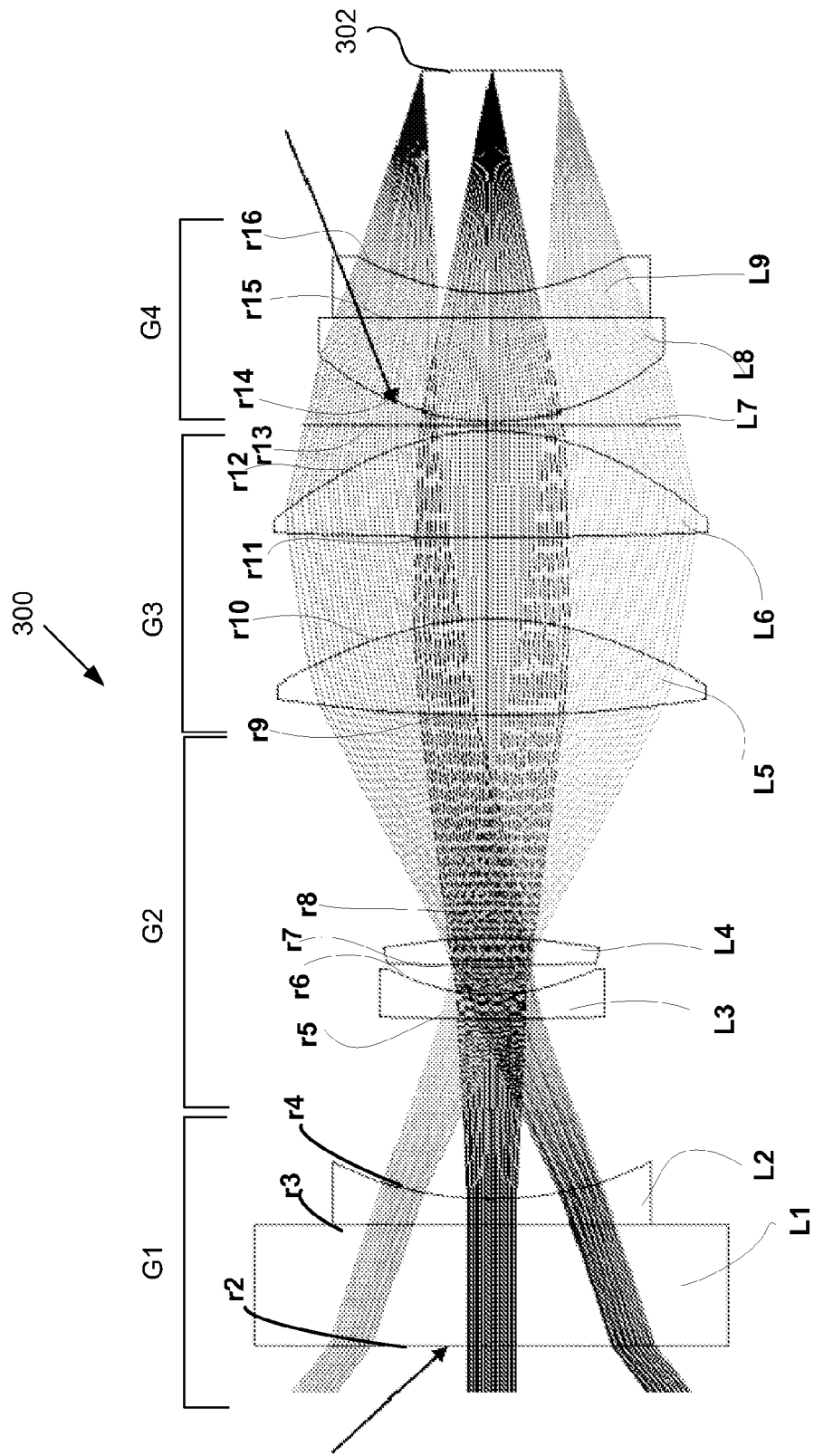
FIG. 3B is an exemplary illustration of a ray-trace section of an optical zoom lens system 300 fully contracted, in accordance with aspects of the invention.

FIGS. 3A and 3B depict a ray-trace section of one example of an optical zoom lens system 300 according to one embodiment that may be constructed to reflect a magnified image onto an image sensor 302. The system 300 includes a first lens group G1, a second lens group, G2, a third lens group, G3 and a fourth lens group, G4, each of the lens groups including one or more optical lenses. G1 includes lenses L1 and L2, G2 includes L3 and L4, G3 includes L5 and L6 and G4 includes L8 and L9. In addition, the system 300 includes an aperture stop L7, which may control the amount of light reaching the image sensor and may prevent off-image paths from reaching the image sensor.

According to the illustrated example, lenses L1 and L8 are focus-tunable lenses and may contract and expand due to the application of a control voltage, as described above. As shown in FIG. 3A, the lenses L1 and L8 are fully expanded, while in FIG. 3B the lenses L1 and L8 are shown as fully contracted. However it should be appreciated that any curvature in between the two states shown can be achieved by the controlled application of voltage. Unlike the conventional zoom lens system shown in FIG. 1, lens groups G1, G2, G3 and G4 in the optical zoom lens system 300 do not move along the axial length and only the curvature of the focus-tunable lenses L1 and L8 changes.

As illustrated, the remaining lenses L2 through L6 and L9 are not focus-tunable lenses and have a non-changeable optical shape. In the illustrated example, the first lens group G1 includes lens L2 which is a negative plano-concave lens, lens L3 is a negative meniscus lens and lens L4 is a positive meniscus lens. In this example, lenses L5 and L6 are positive bi-convex lenses and lens L9 is a negative plano-concave lens. The lens surfaces for the optical lenses are labeled r2-r16.

Light rays from the image impinge on the first lens group G1 which reflects the light rays onto the second lens group G2. Light rays may be reflected by the second lens group G2 onto the third lens group G3. Light rays may be received by the third lens group G3 and reflected by the third lens group G3 onto the fourth lens group G4. Light rays may be received by the fourth lens group G4 and reflected onto the image sensor 302 to form an image. According to embodiment of the system, as the control voltage is be applied to the L1 and/or L8, as described above, the curvature of the lenses L1 and/or L8 changes, thereby changing the focal length of the optical zoom lens system 300. Changing the focal length varies the field of view of the optical zoom lens system 300. The control voltage may be applied to L1 or L8 or both depending on the desired configuration of the optical zoom system. In at least one embodiment, the optical zoom lens 300 may continue to maintain focus as the curvature of the lenses (and the focal length) changes.

In one embodiment, the system 300 and the characteristics of the optical lenses in the optical lens groups G1, G2, G3 and G4 may be designed using a computer with a ray-trace software package. Although the optical arrangement of various embodiments of this disclosure are new, an optical prescription for optical system 300 in FIGS. 3A and 3B may be generated using an equation which is an industry standard, and would be known to one of ordinary skill in the art. One such prescription is shown in Table 1, in accordance with an embodiment, where r2 through r16 correspond to the lens surfaces r2 though r16 shown in FIGS. 3A and 3B.

TABLE 1

|  | Radius (mm) | Thickness (mm) | Semi-diameter (mm) | Conic (mm) |
| --- | --- | --- | --- | --- |
| r2 | 30.124730 | 19.684771 | 19.760429 | 0.000000 |
| r3 | inf | 2.000000 | 14.572512 | 0.000000 |
| r4 | 28.645806 | 14.003575 | 12.543173 | 0.881784 |
| r5 | 50.134079 | 1.999999 | 8.864700 | −13.206338 |
| r6 | 17.185560 | 3.818209 | 8.077342 | 0.000000 |
| r7 | −65.142245 | 8.732405 | 8.063527 | 18.514582 |
| r8 | −22.798135 | 16.732405 | 10.327651 | 0.000000 |
| r9 | 107.268686 | 4.950183 | 15.355508 | 0.000000 |
| r10 | −40.121821 | 0.569859 | 15.470114 | −3.202970 |
| r11 | −1.99E+04 | 6.685357 | 15.434880 | 0.000000 |
| r12 | −20.641668 | 0.499971 | 15.427094 | −1.226524 |
| r13 | inf | 4.877248 | 14.001709 | 0.000000 |
| r14 | 1373.561340 | 10.019632 | 13.148127 | 0.000000 |
| r15 | inf | 0.238886 | 9.647725 | 0.000000 |
| r16 | 20.240661 | 13.324810 | 8.849774 | −0.056304 |

Different configurations of the optical zoom lens system 300 may be used for different optical tasks, for example those with different fields of view. Some exemplary configurations are shown below in Table 2, where r2 through r16 correspond to the lens surfaces r2 though r16 shown in FIG. 4.

TABLE 2

|  | Field of View | position of object | image center to edge distance | focal length | aperture diameter |
| --- | --- | --- | --- | --- | --- |
| config. 1 | +/−35 deg | object at infinity | 5.52 mm | 9.7 mm | 3.5 mm |
| config. 2 | +/−14.7 deg | object at infinity | 5.49 mm | 21.7 mm | 4 mm |
| config. 3 | +/−35 deg | object at 6000 | 5.53 mm | 9.7 mm | 4.2 mm |
| config. 4 | +/−9.4 deg | object at infinity | 5.5 mm | 34 mm | 7 mm |
| config. 5 | +/−6 deg | object at infinity | 5.4 mm | 52 mm | 27.1 mm |
| config. 6 | +/−6 deg | object at 6000 | 5.4 mm | 52 mm | 27.1 mm |

Figure 4:
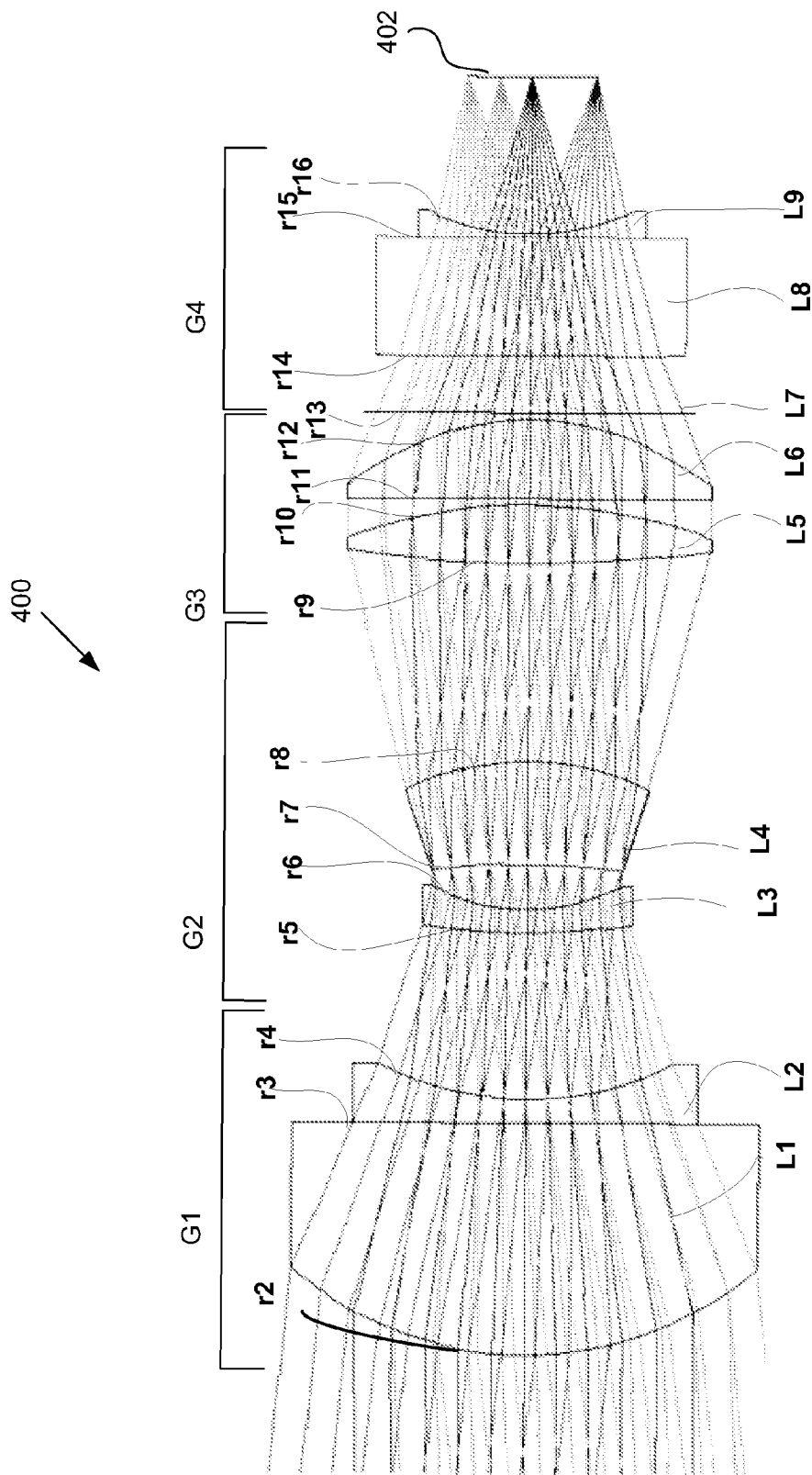
FIG. 4 is an exemplary illustration of a ray-trace section of an optical zoom lens system 400, in accordance with aspects of the invention.

FIG. 4 depicts a ray-trace section of one example of an optical zoom lens system 400 that may be constructed to produce a magnified image, according to one embodiment. In one embodiment, the construction of the optical zoom lens system 400 is similar to the optical zoom lens system 300, including an image sensor 402, except that the distance between the lens elements may be different and the shape and thickness of the lens element may be different. An optical prescription for the optical zoom lens system 400 is provided below in Table 3, where r2 through r16 correspond to the lens surfaces r2 though r16 shown in FIG. 4.

TABLE 3

| Surface | Radius (mm) | Thickness (mm) | Semi-diameter (mm) | Conic (mm) |
|---|---|---|---|---|
| r2 | 24.365 | 14.585 | 15.568 | 0.000 |
| r3 | inf | 2.000 | 11.948 | 0.000 |
| r4 | 24.482 | 0.764 | 10.138 | 2.406 |
| r5 | 23.653 | 2.112 | 10.001 | 0.000 |
| r6 | 11.868 | 6.688 | 8.767 | −0.428 |
| r7 | −15.957 | 2.017 | 8.780 | 0.000 |
| r8 | −19.850 | 14.737 | 9.944 | 0.000 |
| r9 | 107.269 | 9.154 | 21.470 | 0.000 |
| r10 | −29.211 | 0.471 | 21.756 | −2.887 |
| r11 | 77.729 | 17.789 | 24.256 | 0.000 |
| r12 | −21.117 | 0.540 | 23.319 | −1.300 |
| r13 | inf | 5.507 | 17.649 | 0.000 |
| r14 | 180.216 | 3.736 | 14.606 | 0.000 |
| r15 | inf | 4.179 | 13.473 | 0.000 |
| r16 | 34.648 | 16.071 | 11.376 | −6.654 |

Different configurations of the optical zoom lens system 400 may be needed for different optical tasks, for example those with different fields of view. Some exemplary configurations are shown below in Table 4.

TABLE 4

| | Field of View | position of object | image center to edge distance | focal length | aperture diameter |
|---|---|---|---|---|---|
| config. 1 | +/−35 deg | object at infinity | 1 mm | 9.51 mm | 3.711 mm |
| config. 2 | +/−14.7 deg | object at infinity | 2.28 mm | 21.896 mm | 7.277 mm |
| config. 3 | +/−35 deg | object at 6000 | 1 mm | 9.554 mm | 3.974 mm |
| config. 4 | +/−9.4 deg | object at infinity | 3.548 mm | 34.108 mm | 11.932 mm |
| config. 5 | +/−3 deg | object at infinity | 3.69 mm | 35.665 mm | 27.836 mm |
| config. 6 | +/−3 deg | object at 6000 | 5.4 mm | 35.401 mm | 27.836 mm |

According to various embodiments, characteristics of the optical lens surfaces r1 through r16 in optical zoom lens systems 300 and 400, modeled with the ray-trace software package, may be represented using industry standard glass types, which would be known to one of ordinary skill in the art. Table 5 shows an example of characteristics of different glass types used to model the different lens surfaces r2 though r16 shown in FIGS. 3A, 3B, and 4.

TABLE 5

| Lens | Type | Code | nc | nd | nF | ng | vd | s.g. | Coloring |
|---|---|---|---|---|---|---|---|---|---|
| r2 | S-TIH6 | 805254 | 1.79611 | 1.80518 | 1.82777 | 1.84729 | 25.4 | 3.37 | 44/37 |
| r3 | S-TIH6 | 805254 | 1.79611 | 1.80518 | 1.82777 | 1.84729 | 25.4 | 3.37 | 44/37 |
| r4 | n/a | n/a | n/a | n/a | n/a | n/a | n/a | n/a | n/a |
| r5 | S-LAH59 | 816466 | 1.81075 | 1.816 | 1.82825 | 1.838 | 46.6 | 5.07 | 39/30 |
| r6 | n/a | n/a | n/a | n/a | n/a | n/a | n/a | n/a | n/a |
| r7 | S-BSL7 | 516641 | 1.51386 | 1.51633 | 1.52191 | 1.52621 | 64.1 | 2.52 | 33/29 |
| r8 | n/a | n/a | n/a | n/a | n/a | n/a | n/a | n/a | n/a |
| r9 | S-NSL36 | 517524 | 1.51444 | 1.51742 | 1.52431 | 1.5298 | 52.4 | 2.46 | 36/34 |
| r10 | n/a | n/a | n/a | n/a | n/a | n/a | n/a | n/a | n/a |
| r11 | S-FPL53 | 439950 | 1.43733 | 1.43875 | 1.44195 | 1.44442 | 95 | 3.62 | 33/29 |
| r12 | n/a | n/a | n/a | n/a | n/a | n/a | n/a | n/a | n/a |
| r13 | n/a | n/a | n/a | n/a | n/a | n/a | n/a | n/a | n/a |
| r14 | S-FPL53 | 439950 | 1.43733 | 1.43875 | 1.44195 | 1.44442 | 95 | 3.62 | 33/29 |
| r15 | S-FPL53 | 439950 | 1.43733 | 1.43875 | 1.44195 | 1.44442 | 95 | 3.62 | 33/29 |
| r16 | n/a | n/a | n/a | n/a | n/a | n/a | n/a | n/a | n/a | nd refractive indices of the material at the wavelengths of the Fraunhofer D - line (or helium line)
vd Abbe number
nf refractive indices of the material at the wavelengths of the Fraunhofer F - line
nc refractive indices of the material at the wavelengths of the Fraunhofer C - line
ng group refractive index
Dispersion = nf − nc It is appreciated that the optical prescriptions and parameters in Tables 1-5 are exemplary only, and that the prescriptions of optical zoom lens systems 300 and 400 are determined by the intended imaging task to be performed by each optical zoom lens system 300 and 400 respectively.

According to various embodiments, the focal length of the optical zoom lens systems 300 and 400 changes as a result of applying the control voltage to the focus-tunable lenses L1 and/or L8 and changing the curvature of the lenses L1 and/or L8. The lenses L2 through L6 and L9 remain stationary and only the curvature of the focus-tunable lenses L1 and/or L8 changes. Varying the focal length of the system changes the field of view of the optical zoom lens system resulting in a magnified image produced by the image sensor. The optical zoom lens systems 300 and 400 described above may be included in various imaging systems used in harsh environmental conditions, for example, in a wearable personal imaging system, a surveillance camera system, or an unmanned aerial vehicle camera system.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical zoom lens system comprising:
a first lens group including a first focus-tunable lens and a first negative lens;
a second lens group, positioned after the first lens group in an optical path;
a third lens group, positioned after the second lens group in the optical path; and
a fourth lens group, positioned after the third lens group in the optical path, including a second focus-tunable lens and a second negative lens.

2. The optical zoom lens system of claim 1, wherein the first focus-tunable lens and the second focus-tunable lens each has a curvature which changes in response to an applied control signal.

3. The optical zoom lens system of claim 2, wherein the optical system has a field of view that changes based on changes to at least one of the curvature of the first focus-tunable lens and the curvature of the second focus-tunable lens.

4. The optical zoom lens system of claim 2, wherein the optical system has a focal length that changes based on changes to at least one of the curvature of the first tunable lens and the curvature of the second focus-tunable lens.

5. The optical lens system of claim 4, wherein the focal length is configured to change from approximately 8 mm to 57 mm.

6. The optical zoom lens system of claim 1, wherein the first tunable lens and the second focus-tunable lens are plano-convex lenses.

7. The optical zoom lens system of claim 1, wherein the first tunable lens and the second focus-tunable lens each has a variable focal length that changes in response to an applied control signal.

8. The optical zoom lens system of claim 7, wherein the variable focal length is between approximately 10 millimeters and 165 millimeters.

9. The optical zoom lens system of claim 1, further comprising an aperture stop disposed between the third lens group and the fourth lens group.

10. The optical zoom lens system of claim 1, wherein the second lens group further includes a first negative meniscus lens and a first positive meniscus lens.

11. The optical zoom lens system of claim 10, wherein the third lens group further includes a first positive lens and a second positive lens.

12. The optical zoom lens system of claim 11, wherein the first positive lens includes a bi-convex lens.

13. The optical zoom lens system of claim 11, wherein the second positive lens includes a plano-convex lens.

14. The optical zoom lens system of claim 13, wherein the field of view is configured to change from plus or minus approximately 3 degrees to approximately 35 degrees.

15. The optical zoom lens system of claim 11, wherein the second positive lens includes a biconvex lens.

16. A method of magnifying an image using an optical zoom lens system, the method comprising:
reflecting, using a first lens group including a first focus-tunable lens and a first negative lens, light rays incident thereon from the image;
reflecting, using a second lens group, the light rays reflected by and received from the first lens group;
reflecting, using a third lens group, the light rays reflected by and received from the second lens group;
reflecting, using the fourth lens group including a second focus-tunable lens and a second negative lens, the light rays reflected by and received from the third lens group toward an image sensor.

17. The method of claim 16, further comprising applying a control signal to at least one of the first focus-tunable lens and the second focus-tunable lens to change a curvature of at least one of the first focus-tunable lens and the second focus-tunable lens.

18. The method of claim 16, further comprising applying a control signal to at least one of the first focus-tunable lens and the second focus-tunable lens to adjust a field of view the optical zoom lens system.

* * * * *